United States Patent [19]
Abe

[11] 4,018,132
[45] Apr. 19, 1977

[54] CONNECTING-ROD BOLT
[75] Inventor: Michio Abe, Kasugai, Japan
[73] Assignee: Tokai Cold Forming Co., Ltd., Kasugai, Japan
[22] Filed: July 24, 1975
[21] Appl. No.: 598,725

Related U.S. Application Data

[63] Continuation of Ser. No. 480,378, June 18, 1974, abandoned, which is a continuation of Ser. No. 389,245, Aug. 17, 1973, abandoned, which is a continuation of Ser. No. 172,974, Aug. 23, 1971, abandoned.

[52] U.S. Cl. .................. 85/1 L; 10/27 R; 85/1 T
[51] Int. Cl.² .......................... F16B 27/00
[58] Field of Search ........... 85/1 R, 1 T, 1 L, 46, 85/42; 151/41.73, 16; 52/758 F; 10/27 R, 27 E; 75/126 C; 74/579 E, 579 R, 580

[56] References Cited
UNITED STATES PATENTS

| | | | |
|---|---|---|---|
| 2,019,049 | 10/1935 | Hoke | 85/1 R |
| 2,024,069 | 12/1935 | Sharp | 85/1 R |
| 2,407,928 | 9/1946 | Herreshoff et al. | 85/1 R |
| 3,418,012 | 12/1968 | Torre | 85/19 X |
| 3,418,013 | 12/1968 | Kelly | 52/758 F |
| 3,455,587 | 7/1969 | Gallois | 85/1 R X |
| 3,719,476 | 3/1973 | Tanczyn | 75/126 C |
| 3,772,005 | 11/1973 | de Barbadillo | 75/126 C |
| D34,691 | 6/1901 | Monroe | 85/21 |

FOREIGN PATENTS OR APPLICATIONS 327,409   3/1958   Switzerland

Primary Examiner—Roy D. Frazier
Assistant Examiner—Thomas J. Holko
Attorney, Agent, or Firm—Schmidt, Johnson, Hovey & Williams

[57] ABSTRACT

A bolt usable for fastening connecting rods wherein an intermediate threaded portion is formed in the bolt shank between the bolt head and the fastening thread portion, which intermediate thread is reverse to and has a greater pitch than that of the fastening thread. A method of manufacturing the bolt is disclosed which comprises steps of cold heading the bolt head and rolling screw thread for fastening the big end portion of the connecting rod, further rolling the intermediate screw thread having reversed screw thread with respect to the fastening thread between the bolt head and the fastening thread and reducing the diameter of the intermediate thread through a finishing die.

4 Claims, 7 Drawing Figures

CONNECTING-ROD BOLT

This application is a continuation of application Ser. No. 480,378, filed June 18, 1974, which in turn is a continuation application of application Ser. No. 389,245, filed Aug. 17, 1973, which in turn is a continuation of application Ser. No. 172,974, filed Aug. 23, 1971, all now abandoned and priorities thereof are claimed.

The present invention generally relates to a bolt and a method of manufacturing the same usable for fastening the big end portion of the connecting rod used in reciprocating type internal combustion engine, and more particularly to a fastening bolt having a novel shape free from notch effect and, to an efficient and simple method of manufacturing the same without necessity for complicated working processes, such as, machining, grinding etc.

The recent increase in the running speed of automobiles has meant a substantial increase in the number of revolutions of the automobile engine. And accordingly, the load imposed upon the connecting rod bolt used at the big end portion of the connecting rod is also much greater. Under these new conditions, the tensile strength (80 to 90 kg/mm$^2$) of the conventional connecting rod bolt is insufficient. The bolt cannot hold out under the increased tensile load and trouble, such as, break or fracture of the connecting rod bolt frequently occurs. From the above mentioned reasons, there has been need for a connecting rod bolt superior in mechanical properties to those of the conventional connecting rod bolt. The new standards to be met include tensile strength of from 130 to 140 kg/mm$^2$, proof strength of from 117 to 125 kg/mm$^2$ and a fatigue limit of ±10 kg/mm$^2$. Mere modifications of the material qualities and heat treatment processes etc. have proven inadequate to meet the new requirements. In other words, it is necessary, for example, to make the underhead fillet adjacent the bolt head more round, the root portion of the screw thread at the end portion of the thread more round and to decrease the diameter of the bolt shank so as to increase the elastic elongation thereof. For these reasons, the shape of the conventional connecting rod bolt was slightly modified as illustrated, for example, in FIGS. 1 and 2. A bolt as shown in FIG. 1 is an example of the typical so called elastic bolt wherein designated numerals 1 and 2 are portions fitting (hereinafter referred to as fitting portion) into the bolt hole provided in the big end portion of the connecting rod and having dimensions coinciding exactly with the dimensions of said bolt hole. The conventional connecting rod bolt generally has a fastening thread 3, underhead fillet portion 4 adjacent the bolt head 8 and slender portions 5, 6 and 7 the diameter of which is almost equal to or about 90% of the minor diameter of the fastening thread 3 so as to increase the fatigue limit of the bolt and avoid concentration of stress at the transitional portions of the sectional deformation and giving consideration to the notch effect thereof. A different type of conventional connecting rod bolt is illustrated in FIG. 2. The contour of this connecting rod bolt is such that it is generally usable for automobile engines having an output of less than 100 horse power. This bolt has, like the bolt shown in FIG. 1, a portion which fits into the bolt hole of the big end portion of the connecting rod, a fastening thread portion and under-head fillet portions 4, 5 adjacent the bolt head 8.

However, the mechanical properties of these conventional bolts as shown in FIGS. 1 and 2 do not meet the demands imposed by present day engines. In use the fastening torque of the screw is inadequate, fretting corrosion occurs, and the bolt cracks or breaks due to said fretting corrosion, which leads, in turn, to various engine troubles. In addition to the above, the manufacturing process of such conventional connecting rod bolt is complicated and troublesome.

Accordingly, the main object of this invention is to produce a bolt without the above mentioned drawbacks of the convention connecting rod bolt and to supply a method of manufacturing the same.

It is also an object of this invention to provide a connecting rod bolt which has sufficient mechanical strength and reliability and is free from any notch effect.

Another object of this invention is to provide a connecting rod bolt having excellent fatigue strength and proof strength and a self locking effect.

Another object of this invention is to provide a novel method of manufacturing a connecting rod bolt having a novel shape which necessitates no troublesome and complicated working processes, such as, machining, grinding etc. which are essential in making the conventional connecting rod bolt.

To summarize, a connecting rod bolt of this invention is characterized in that the diameter of the underhead fillet of the cold headed bolt of the starting material is the same as equal to that of the fastening thread portion (this portion corresponds to the nut end thread portion of the bolt) before thread rolling. Said fastening thread portion is formed on the opposite end portion of the bolt head by the thread rolling method, and the other screw threaded portion is formed by the similar thread rolling process at an intermediate portion between the bolt head and the fastening thread portion of the bolt shank. The pitch of the intermediate portion screw thread is greater than that of the nut end fastening screw thread, and the outside diameter of the intermediate thread is greater than that of the fastening screw thread. In the last step the intermediate screw thread portion is finished by an ironing process or by a bolt shank reducing process (hereinafter referred to as bolt shank reducing) so as to fit exactly into the bolt hole provided in the big end portion of the connecting rod. The finished product is characterized by the preciseness of its dimensions and finish.

In the conventional working processes for manufacturing the prior art connecting rod bolt, the starting bolt shank generally has a larger diameter during cold forging, and subsequently, the underhead fillet portion adjacent the bolt head, the tension loaded portion and the shank body of the bolt which is to provide a portion fitting in the bolt hole are respectively formed by machining and grinding. All these subsequent steps can be omitted from the manufacturing process in accordance with the present invention.

According to the method of manufacturing the connecting rod bolt of this invention, the diameter of the whole bolt shank during the cold forging process is the same pitch diameter as the thread rolling of the fastening thread portion so as to simplify the cold forging process. A screw thread having a greater pitch than that of the fastening thread is roll threaded between the underhead fillet portion adjacent the bolt head and the nut end screw thread. And the outer diameter of this intermediate screw thread is made larger than that of the nut end fastening thread, and then the outside diameter of said intermediate reverse-thread portion (hereinafter referred to as fitting thread portion) is subjected to the bolt shank extruding process so that the finished outside diameter thereof fits exactly into the bolt hole of the connecting rod. And thus, the complicated and expensive manufacturing processes of machining, grinding etc. that are necessary in the prior art can be wholly omitted.

Furthermore, according to the present invention, the radius of the underhead fillet is made more round, and the intermediate screw thread having a greater pitch than that of the fastening thread and having larger root curvature, is roll threaded so that the notch effect of the root portion of the intermediate screw thread is reduced in spite of smaller minor diameter by from 2 to 10% than the minor diameter of the fastening screw thread, the elastic elongation and fatigue strength of the bolt are substantially raised, and engine troubles due to breaking or fracture of the connecting rod bolt caused by fretting corrosion generated by slight frictional motion between the wall of the bolt hole of the connecting rod and the bolt shank, can be completely prevented since a screw thread is formed at the bolt shank portion corresponding to the portion which fits in the bolt hole of the connecting rod and said shank portion being treated or finished precisely by bolt shank reducing process.

In addition to the above, the intermediate screw thread or fitting thread portion is formed as a reversed screw thread as to the screw thread of the fastening thread so that a self locking effect of the fastening thread can be obtained.

The foregoing object and other objects as well as characteristic features of this invention will become more apparent and more readily understandable by the following description and claims when read in conjunction with the accompanying drawing, in which:

Figure 6A:
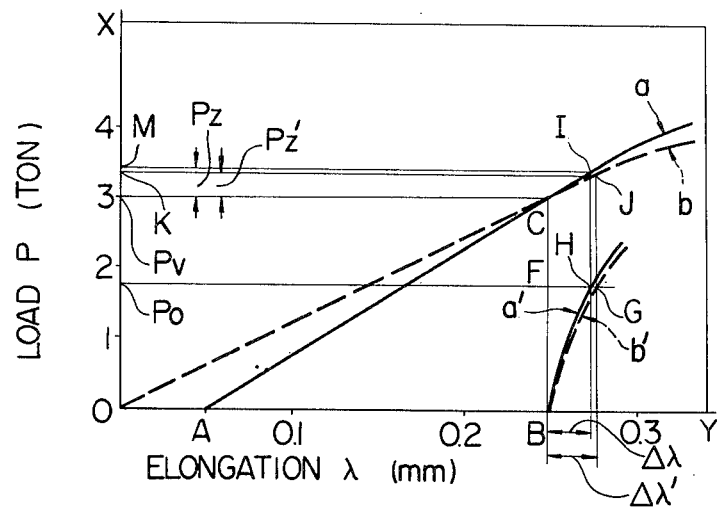
Figure 6B:
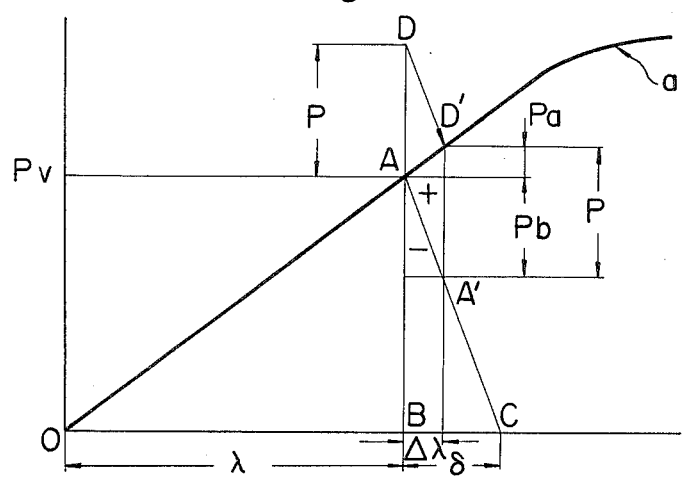

FIG. 6a shows, in combination, a load-elongation curve and an additional working load-elongation curve of the connecting rod bolt of this invention obtained under actual fastening conditions in comparison with those of the conventional connecting rod bolt; and FIG. 6b shows a preload triangle diagram which explains the relationships between the load-elongation curve and the additional working load-elongation curve as shown in FIG. 6a.

Figure 3:
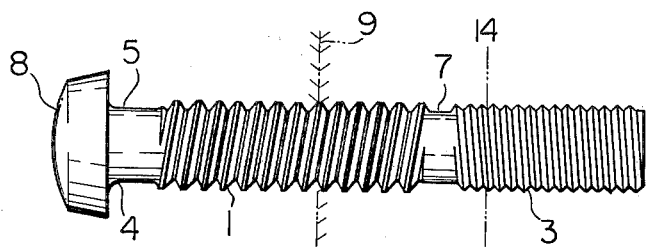
FIG. 3 shows the shape of the connecting rod bolt in accordance with the present invention.

Referring now to FIG. 3 and to FIGS. 6a and 6b, the invention will be hereinafter described in greater detail.

Figure 4:
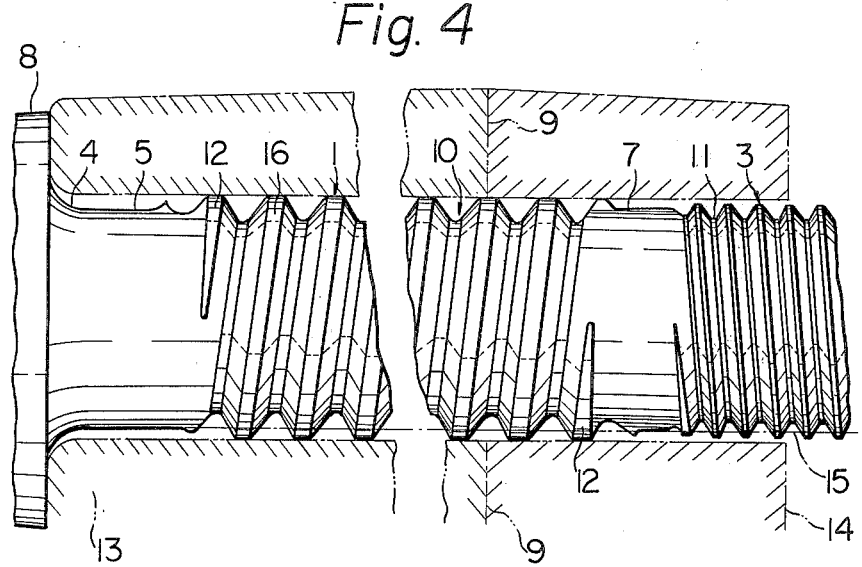
FIG. 4 is an enlarged sectional diagram illustrating in greater detail the connecting rod bolt shown in FIG. 3.

Referring to FIGS. 3 and 4, the connecting rod bolt of this invention has an underhead fillet 4 or fillet curvature 5 adjacent the bolt head 8 and a transitional portion 7 between the fastening thread portion 3 and a fitting thread portion 1. The diameters of portions 5 and 7 are equal to those of the starting material for roll threading and nearly the same as the effective diameter of the fastening thread 3. The diameter of the underhead fillet portion 4 adjacent the bolt head 8 is slightly less than that of the bolt hole in the big end portion of the connecting rod into which the connecting rod bolt is fitted, and accordingly, the neck curvature of the underhead fillet portion 4 adjacent the bolt head 8 can be any one from 0.1 to 0.15 times the outside diameter of the external thread of the fastening thread portion 3 so that the stress concentration generating in the underhead fillet or rounded portion 4 or 5 can be sufficiently reduced. The fastening thread portion 3 has the desired thread accuracy being roll threaded at room temperature from the same starting diameter as shown in FIG. 4 by a dotted line 15 as unthreaded parts 5 and 7 of the bolt. The outside diameter of this fastening thread 3 is slightly less than the diameter of the bolt hole provided in the connecting rod and the thread formed is generally a right-hand thread.

Fitting thread portion 1 which fits into the bolt hole of the connecting rod, is also formed by thread rolling process from the starting or original diameter of bolt shank as shown by the dotted line 15. The pitch of the fitting thread 1 is made greater than that of the fastening thread 3 and it is rolled as a left-hand thread (or very rarely right hand thread). The outside diameter of this external thread of the fitting thread portion 1 is first made slightly larger than the diameter of the bolt hole in the connecting rod big end portion and then it is reduced and finished by passing through a reducing die so that the finished fitting thread 1 fits closely into the bolt hole of the connecting rod.

The steps in making connecting rod bolt in accordance with this invention are preferably carried out in the following order; cold heading, thread rolling, heat treating, finishing the fastening thread portion by finishing thread rolling process under the thread rolling ratio of from 2 to 5%. The finished connecting rod bolt has fatigue limit higher than that of the conventional connecting rod bolt. For example, a connecting rod bolt having the tensile strength of from 100 to 130 kg/mm$^2$ and fatigue limit of from ±4 to 6 kg/mm$^2$, is improved by finishing thread rolling subsequent to the heat treatment, and so, a fatigue limit of ±10 to 15 kg/mm$^2$ can be obtained in the fastening thread portion. Furthermore, in the connecting rod bolt of this invention, the radii of the root roundings in the incomplete thread portions of the fastening thread 3 and fitting thread 1 are respectively made equal or slightly larger than in those of the complete thread portion so as to avoid any kind of stress concentration in said incomplete thread portion due to variation of cross sectional area in axial direction of the connecting rod bolt.

The screw thread of the fitting thread 1 of this invention, as mentioned above, is generally reversed in relation to that of the fastening thread 3, and the pitch thereof is made about two times the pitch of the fastening thread 3. The radius 10 of the root of the fitting thread 1 is, therefore, about two times or more than radius of the root 11 of the fastening screw thread 3. This is clearly illustrated in FIG. 4, and in this embodiment, the radius of root rounding 10 is larger by twice or more than the radius of the root 11 of the fastening thread 3 and the root diameter of the former is smaller by 7 to 8% than the root diameter of the latter. The formation of an incomplete screw end portion 12 is generally inevitable and remains even after the finishing thread reducing process; however, the strength of the connecting rod bolt is not diminished due to the above incompleteness as in the conventional connecting rod bolt. The bolt holes 13, 14 in the big end portion and the end of the connecting rod are provided to engage with the connecting rod bolt therein and are divided into two parts making a boundary portion designated as 9.

Figure 5:
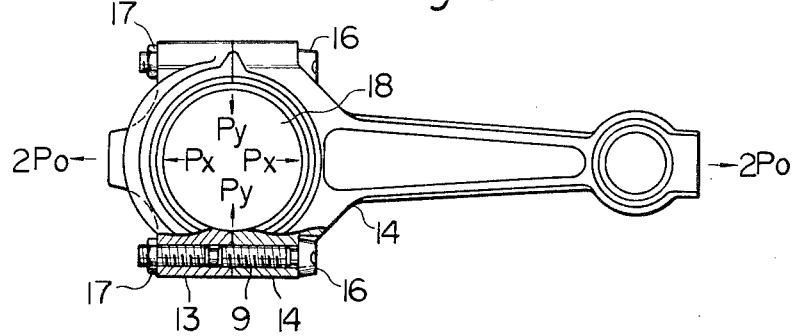
FIG. 5 shows the connecting rod bolt of this invention in use fastened to the big end portion of the connecting rod of an internal combustion engine.

FIG. 5 illustrates connecting rod bolts manufactured in accordance with the instructions of this invention inserted in and fastening the connecting rod.

Figure 2:
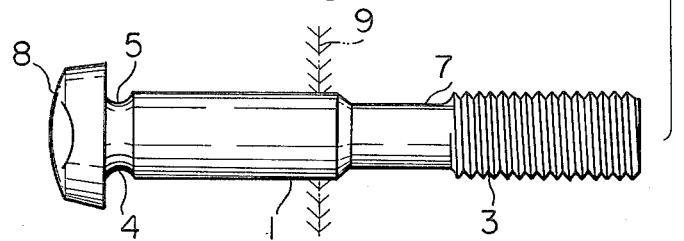

Referring now to FIGS. 6a and 6b the advantages and effects of this invention will be hereinafter described in greater detail;

FIG. 6a shows, in combination, load-elongation curves and additional working load-elongation curves. The load-elongation curves were obtained by tensile tests in which a conventional type connecting rod bolt as shown in FIG. 2 (hereinafter referred to as bolt A) and a novel connecting rod bolt of this invention as illustrated in FIG. 3 (hereinafter referred to as bolt B), were respectively used as individual tensile test specimens. The additional working load-elongation curves show the results of further tensile loading tests achieved with the connecting rod assembly in which the connecting rod bolts are fastening the big end portion of the connecting rod. That is, elongation generated in the bolt under tensile load imposed upon the connecting rod assembly was plotted against the additional working load.

Referring again to FIG. 6a, the load elongation curve $a$ corresponds to the connecting rod bolt A, and $b$ corresponds to bolt B. According to the load-elongation diagrams, in case the bolt A or the bolt B is in use for fastening the big end portion of the connecting rod by an appropriate fastening load or torque, that is, in case a tensile load, $Pv$ is exerted upon the bolt A or B, the bolt A elastically elongates a length $\overline{AB}$ and the bolt B a length $\overline{OB}$, and as the drawing shows, $\overline{AB}$ is smaller than $\overline{OB}$. On the other hand, the curves $a'$, $b'$ show respectively additional working load elongation relationships which were obtained by imposing tensile loads of from zero to $Pv$ as the working loads upon the fastened connecting rod assembly. That is, the longitudinal axis (X-axis) represents a working load applied additionally to the bolt A or B fastening the big end portion of the connecting rod, while the horizontal axis (Y-axis) represents an elongation generated in the fastening bolt A or B corresponding to the additional working load.

As is generally well known by those who are skilled in the art, if a bolt having spring constant of $Cb$ fastens an article having a spring constant of $Ca$ with a fastening force $Pv$ applied to the fastening bolt, and then a working load $P$ is applied to the article, the additional force $Pa$ exerted upon the fastening bolt is derived in accordance with the following equation:

$$Pz = (Cb/Ca + Cb) \cdot Po \quad (1)$$

wherein the spring constant C is generally given as follows;

$$C = E \cdot F / l \quad (2)$$

whereby,
E: Young's modulus,
F: compression load section area,
l: fastening length.

The above described relationships can be analyzed by so called pre-load triangle diagram as is shown in FIG. 6b. In the drawing, the curved diagram shows tensile-load elongation diagram obtained by an individual bolt. According to the diagram, in case that the fastening force of the bolt is $Pv$, the bolt elongates elastically by $\lambda$, while the fastened article is elastically contracted by $\delta$ in compressional direction.

In this condition as shown in the drawing, when a working load $P$ is further applied to the bolted joint, a length $\overline{D'A'}$ between the cross point $D'$ on the curve $a$ and the cross point $A'$ on the line $\overline{AC}$ is equal to the working load P. And this working load P can be divided into two components $Pa$ and $Pb$ by extending the line $\overline{PvA}$ horizontally. In this condition, a component $Pa$ corresponds to the additional working load of the bolt generated by the above working load P and the other component $Pb$ corresponds to the internal energy which is absorbed by the bolted joint assembly. In other words, the fastened bolt further elongates by $\Delta\lambda$ in proportion to the further working load P applied to the bolted joint assembly; on the other hand, the contraction of said bolted joint assembly can be reduced by $\Delta\lambda$. And thus, the area of the triangle as shown in FIG. 6b by + (plus) mark corresponds to the positive energy; + ($\Delta\lambda \cdot Pb/2$) generated in the fastening bolt, while the area of the other triangle designated as − (minus) mark in the drawing corresponds to the negative energy; − ($\Delta\lambda \cdot Pb/2$) generated in the bolted joint assembly. This means that the component $Pb$ of the working load has been absorbed into the bolted joint assembly.

As is clearly understood from the above descriptions, the additional working load generated in the bolt due to the working load applied to the bolted joint assembly is remarkably smaller in comparison with the working load P. That is, the additional working load generated in the fastened connecting rod bolt is no more than from 0.2 to 0.5 times the working load.

As described above, the curves $a$, $b$, $a'$ and $b'$ illustrated in the drawings FIGS. 6a and 6b, are obtained from the tensile loading tests on the individual bolts and connecting rod assembly fastened by the connecting rod bolt. And the diagrams show results of some examples of the actual load and elongation recorded by an X - Y recording device. Now, referring to FIG. 5, in the case a tensile working load is imposed upon the fastened connecting rod assembly, a working load $Po$ is effected on each of the bolts fastening both sides of the big end portion of the connecting rod. Under this condition, the bolt A elongates elastically a length $\overline{FH}$ as shown in FIG. 6a that is by $\Delta\lambda$, while the bolt B elongates elastically a length $\overline{FG}$, that is, by $\Delta\lambda'$. The additional working loads generated on the bolts fastened to the connecting rod correspond respectively to elastic elongations $\Delta\lambda$ and $\Delta\lambda'$ of bolt A and/or B and are, as shown in the diagram FIG. 6a, $\overline{PvM} = Pz$ for the bolt A and $\overline{PvK} = Pz'$ for the bolt B. As is readily understood from the above descriptions referring to the drawing, the additional working load generated in the bolt B of this invention, is rather smaller than that of the bolt A of the conventional type. In other words, in the case loads $Pz$ or $Pz'$ are imposed repeatedly upon the connecting rod bolt during the rotation of cranks shaft of the engine, the conventional bolt will be fractured or broken by fatigue thereof as the value of the load $Pz$ or $Pz'$ exceeds the fatigue limit of the individual connecting rod bolt used. In contrast, the elastic elongation of the connecting rod bolt manufactured by the instructions of this invention is much more at the fitting thread portion 1 than that of the conventional connecting rod bolt, so that the additional working load imposed upon the connection rod bolt due to the applied working load of the connecting rod, is reduced substantially. In addition to the above, the radius of the root at the fitting screw thread 1 is made large enough so that the notch effect at these root roundings could be completely eliminated. Accordingly, even in case fracture or break of the bolt occurs, it occurs at the fastening thread portion and so, the strength and rigidity of the fastening thread portion can be effectuated with the effect for improving the mechanical properties thereof.

Furthermore, referring to FIG. 5, when a working load 2Po is imposed upon the connecting rod, a force Px is exerted upon the crank-pin bearing portion 18 in the working load direction and a force Py is exerted upon said crank-pin bearing portion in the direction vertical to the working load direction, and accordingly, the crank-pin bearing portion of the connecting rod is deformed into the shape of an ellipse. Therefore, in this condition, a bending load is exerted upon the bolts fastening the big end portion of the connecting rod, and a slight frictional motion is effected between the bolt hole wall of the big end portion and the outside surface of the fitting portion or fitting threaded portion of the bolt shank of the connecting rod bolt. This is why, in the conventional connecting rod bolt, fretting corrosion occurs in the vicinity of the portion abutting the divided big end portion of the connecting rod. And this is also why stress concentration is frequently observed in such portion and fractures or breaks of the bolt occur so frequently at this point.

Figure 1:
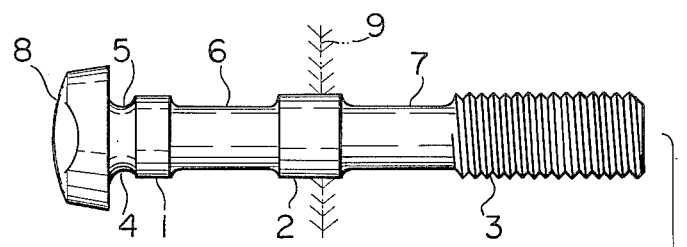
FIG. 1 and FIG. 2 show examples of the conventionally shaped connecting rod bolts.

However, the fitting portion of the bolt shank of the connecting rod bolt of this invention is threaded, and is free from the slender bolt shank portions, such as, portions 5, 6 and 7 of the conventional type bolts as shown in FIG. 1, and accordingly, a stress due to twisting load exerted upon the bolt is reduced remarkably even if greater fastening torque is applied in fastening the bolt. In addition to the above, this bolt is capable of bearing a substantially greater load than the conventional prior art bolt.

The fitting thread is reversed with respect to the fastening thread; that is, generally, the fastening thread is a right hand thread, and so, the fitting thread is a left hand thread. Therefore, in case a tensile working load Po is applied to the bolt in the longitudinal direction thereof, then the bolt elongates and simultaneously twists in a clock-wise direction. In other words, the bolt tightens itself with respect to the nut and thus it achieves a self locking effect.

Next, referring to the exemplified embodiment, the steps in manufacturing the connecting rod bolt of this invention will be described in greater detail.

The process is carried out at room temperature.

As a starting material, a coiled wire bar of the diameter desired for the major diameter of the fastening thread portion is prepared. Firstly, bolt head portion 8 and underhead fillet portions 4, 5 adjacent said bolt head 8 are forged simultaneously at room temperature using an ordinary type heading machine usable for cold heading or rolling of bolts. Accordingly, the manufacturing process of this invention is very easy and simple. In the exemplified embodiment, the outside diameter of the fastening thread 3, the diameter of the unthreaded bolt shank portion and pitch are given $8_{-0.05}^{-0.1}$ mm$\phi$, 7.3 mm$\phi$ and 1.0 mm respectively. As described above, the outside diameter of the fastening thread 3 is made nearly equal to that of the unthreaded bolt shank portion. A left hand thread 1 having an outside diameter of $8_{+0.15}^{+0.1}$ mm$\phi$ and a pitch of 2 mm, is then rolled between the underhead fillet 4 adjacent the bolt head 8 and the fastening thread 3 by thread rolling technique at room temperature. The left hand thread is cold rolled, and the outside diameter is made slightly greater than the diameter of the bolt hole (8.10 mm$\phi$) provided in the big end portion of the connecting rod. Next, the intermediate, fitting thread portion is finished by the thread extruding or ironing method using an extruding die so that said intermediate threaded portion fits closely into the bolt hole in the big end portion. In the exemplified embodiment of this invention, a JIS chromium-molybdenum steel No. 4 is used as a starting material. The cold forged connecting rod bolt is heat treated and then the finishing thread rolling process of the fastening thread is carried out. In this way a connecting rod bolt with excellent mechanical properties is obtained, for example, tensile strength of from 132 to 135 kg/mm$^2$, yield strength of from 118 to 120 kg/mm$^2$ and fatigue limit of the threaded portion of $\pm15$ kg/mm$^2$. So far as to the fatigue limit strength of the bolt manufactured by the instructions of this invention, is nearly equal to that of the bolt of the prior art as shown in FIG. 1 or FIG. 2, however, according to the specific shape or construction of the bolt provided by this invention, the fracture thereof during in use occurs generally at the fastening thread portion. The root diameters of the fastening thread portion 3 and the fitting thread portion 1 of the connecting rod bolt for this exemplified embodiment, are 6.65 mm and 6.15 mm respectively.

According to the construction of the above described bolt of this invention, the fatigue limit strength of the fastening thread portion due to the notch effect at the root of the screw thread thereof was about 11.5% of the tensile strength of the simple round bar having the same diameter as the screw thread.

The transversal sectional area of the root portion of the fitting thread is smaller by about 14% than that of the fastening thread portion, and no finishing thread rolling process for improving or raising the fatigue limit strength is required for the connecting rod bolt manufactured by the instructions of this invention. In contrast, in manufacturing the conventional type of connecting rod bolt a second thread rolling step is generally required subsequent to the heat treatment so as to give a reduction of the transversal sectional area by about 2 to 3%. However, the fracture of the bolt of this invention generally occurs at the fastening thread portion during the fatigue endurance test of the individual bolt. The reason for the above described specific behaviour of the fracture observed in the connecting rod bolt of this invention is that the radius of the curvature of the root of the fitting thread portion is about 0.34 mm which is about three times the radius of 0.11 mm of the root rounding of the fastening thread, and so, the notch effect due to the screw thread at the fastening thread portion can be remarkably lowered.

For example, when bolts A and B, as respectively shown in FIG. 2 and FIG. 3, were fastened so as to generate a tensile load of 3 tons on each the bolts A and B elongated respectively 0.2 mm and 0.25 mm. But when a working load (2Po) of 3.5 tons was further applied to the connecting rod assembly in which the bolt A or B was respectively utilized for fastening the big end portion of the connecting rod, the observed further elastic elongation was 0.025 mm and 0.027 mm respectively for the bolt A and B. And accordingly, the additional working loads exerted upon the bolts corresponding to the above mentioned further elastic elongations were respectively 400 kg for the bolt A as shown in FIG. 2 and 320 kg for the bolt B of this invention. In other words, according to the connecting rod bolt of this invention, the additional working load could be reduced to about 80% of the load for conventional connecting rod bolt A. This is quite a respectable improvement in the mechanical properties of the connecting rod bolt and insures satisfactory endurance and reliability in performance. As is readily understood from the descriptions heretofore, the connecting rod bolt of this invention is also remarkably simple and economical to manufacture. The manufacturing process comprises the following steps: upsetting the bolt head 8 working with an ordinary cold heading machine using a coiled wire bar having a diameter from which diameter the thread rolling process is commenced for providing the fastening thread portion; thread rolling the fastening thread portion 3 working with an ordinary thread rolling machine; further thread rolling at the intermediate portion between the nut end fastening thread portion 3 and the bolt head 8, and the fitting thread portion having a prescribed length and an outside diameter slightly greater than the diameter of the bolt hole of the connecting rod; and then extruding said fitting thread portion through a finishing die. This manufacturing process is outstandingly advantageous in comparison with the conventional method of manufacturing connecting rod bolts wherein the underhead fillet portion 4 adjacent the bolt head, slenderized bolt shank portions 6 and 7 and fitting portions 1 and 2 for fitting into the bolt hole of the connecting rod are respectively formed by machining and then said fitting portions 1 and 2 are again subjected to grinding process for precise finishing thereof. In other words, a remarkable improvement in manufacturing efficiency is realized.

The invention can be modified within the range which does not constitute departure from the spirit and scope of the invention as set forth in the appended claims.

What I claim is:

1. A self-tightening fastening bolt for interconnecting separable members having coaxial, bolt-receiving bores therein to present an assembly, the latter being subjected to tensile loads tending to separate said members and elongate said bolt, said fastening bolt being of unitary construction and comprising:
   an elongate bolt shank;
   a bolt head at one end of said shank for engaging one of said members;
   a fastening thread portion presenting fastening threads adjacent the opposite end of said shank configured for fastenably engaging complementally threaded fastening means forming a part of said assembly; and
   a fitting thread portion in the form of a single, continuous fitting thread between said head and fastening thread portion and spaced from the latter with an unthreaded shank portion therebetween, said fitting thread portion being of length to bridge said members when the bolt is operably positioned within said coaxial bores and of a diameter to fit closely within the latter,
   the root diameter of said fitting thread portion being less than that of said fastening thread portion, and less than the diameter of said unthreaded shank portion, for causing the majority of the elastic elongation of said bolt under said tensile loads to occur in the region of said fitting thread portion,
   the threads of said fitting and fastening thread portions being reversed in hand relative to each other, with the pitch of the fitting thread being greater than the pitch of the fastening threads, for causing said bolt to twist during said tensile load-induced elongation in a direction for screwing said fastening thread portion into said fastening means to thereby self-tighten said bolt.

2. The fastening bolt as set forth in claim 1 wherein the root radius of said fitting thread portion is at least twice that of the fastening thread portion for substantially eliminating the notch effect at said fitting thread portion.

3. The fastening bolt as set forth in claim 1 including an arcuate underhead fillet portion between said head and the main body of said shank, said fillet portion having a radius of curvature of from about 0.1 to 0.15 times the outside diameter of said fastening threads for reducing stress concentration at the fillet portion.

4. A self-tightening fastening bolt for interconnecting separable members having coaxial, bolt-receiving bores therein to present an assembly, the latter being subjected to tensile loads tending to separate said members and elongate said bolt, said fastening bolt being of unitary construction and comprising:
   an elongate bolt shank;
   a bolt head at one end of said shank for engaging one of said members, there being an arcuate underhead fillet portion between said head and the main body of said shank;
   a fastening thread portion in the form of a single, continuous, right hand thread adjacent the opposite end of said shank configured for fastenably engaging complementally threaded fastening means forming a part of said assembly; and
   a fitting thread portion in the form of a single, continuous, left hand thread of pitch about twice that of said fastening thread portion and positioned between said fillet portion and fastening thread portion, with respective, unthreaded shank portions between each of the same and said fitting thread portion, the latter being of length to bridge said members when the bolt is operably positioned within said coaxial bores, and of a diameter to closely fit within the latter,
   the radius of curvature of said fillet portion being from about 0.1 to 0.15 times the outside diameter of said fastening threads for reducing stress concentration at the fillet portion,
   the root diameter of said fitting thread portion being from about 7% to 8% smaller than the root diameter of said fastening threaded portion, and less than the diameter of said unthreaded shank portions, for causing the majority of the elastic elongation of said bolt under said tensile loads to occur in the region of said fitting thread portion,
   the opposite hands of said fitting and fastening threads, and the difference in pitch therebetween, being cooperable for causing said bolt to twist during said tensile load-induced elongation in a clockwise direction for screwing said fastening thread into fastening means to thereby self-tighten said bolt,
   the radius of the root of said fitting thread being at least about twice that of said fastening thread for substantially eliminating the notch effect at said fitting thread portion, the radii of the root roundings in the incomplete thread portions of said fastening and fitting threads being at least about equal to the radii of the root roundings of the complete fastening and fitting thread portions, respectively, for reducing stress concentration in the areas of said incomplete thread portions.

* * * * *